March 10, 1925.
H. M. PFLAGER
CAR TRUCK
Filed Oct. 13, 1923
1,528,783
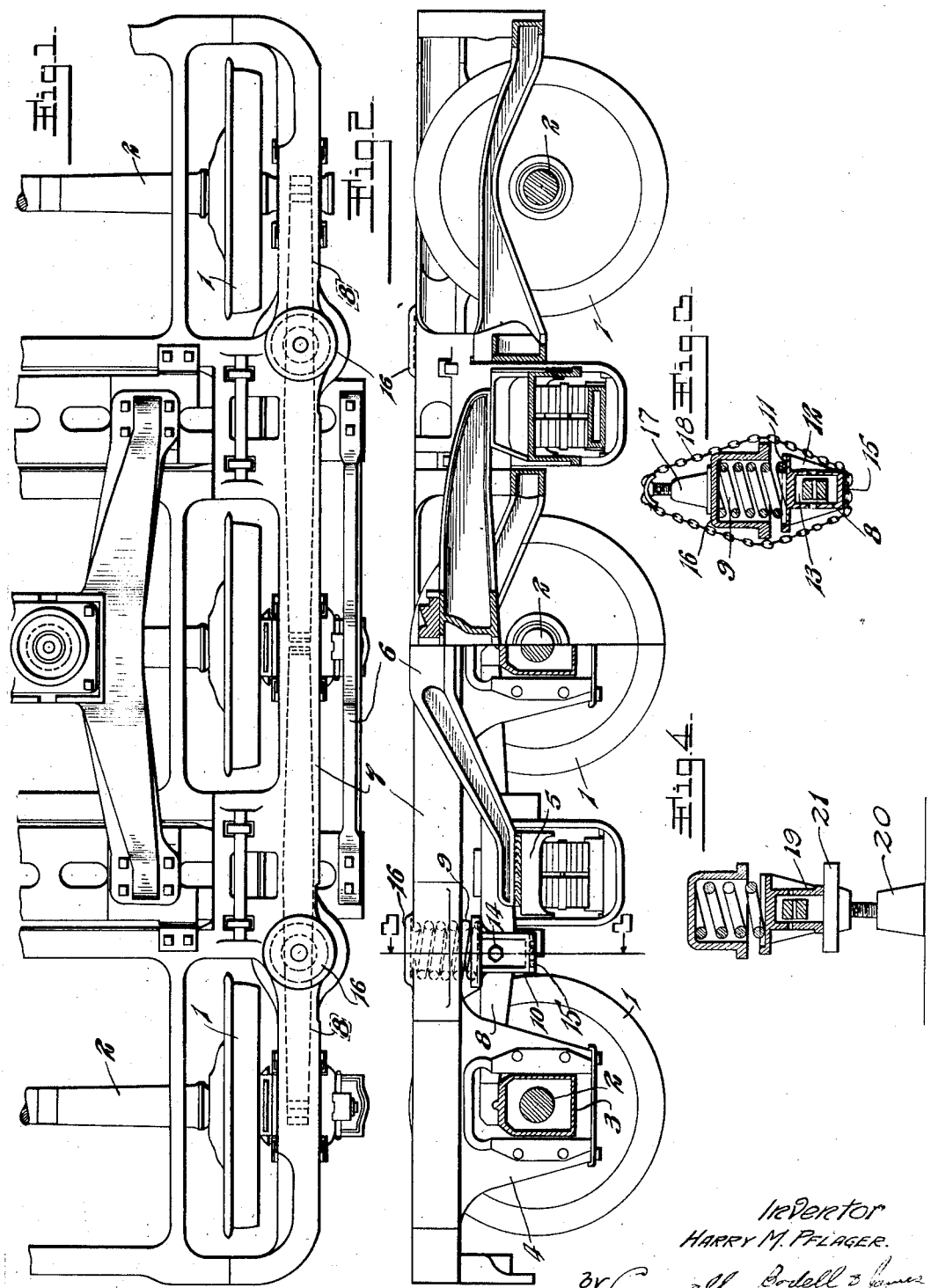
Inventor
HARRY M. PFLAGER.
By Carmall, Bodell & James
His Attorneys.

Patented Mar. 10, 1925.

1,528,783

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

CAR TRUCK.

Application filed October 13, 1923. Serial No. 668,376.

*To all whom it may concern:*

Be it known that I, HARRY M. PFLAGER, a citizen of the United States, residing at St. Louis, Missouri, have invented a certain new and useful Improvement in Car Trucks, of which the following is a specification, such as will enable others skilled in the art to which it appertains to make and use the same.

My invention relates to railroad rolling stock and consists in an improved truck construction and specifically in the mounting of the truck frame on the equalizer bars.

The object of my invention is to facilitate the assembly and disassembly of the equalizer bars with the journal boxes so that the equalizer springs may be removed and replaced readily. This object is accomplished by the provision of saddles upon the equalizer bars which are adapted to be raised to compress the equalizer springs and relieve the bar of the spring pressure so that first the bar and then the spring may be removed.

In the accompanying drawings which illustrate a selected embodiment of my invention,—

Figure 1 is a top view of the longitudinal half of a six wheel car truck embodying my invention.

Figure 2 is in part a side elevation and in part a longitudinal section of the same truck.

Figure 3 is a transverse section taken on the line 3—3 of Figure 2 and showing the application of a jack and chain to the truck frame and spring saddle.

Figure 4 is a similar section but illustrating a modified construction of the saddle and a different application of the spring compressing tools.

The truck includes wheels 1, axles 2, journal boxes 3, pedestals 4, bolsters 5, and side bearings 6, of a familiar type.

The truck frame includes wheel pieces 7, here shown as formed integrally with pedestals 4, although this integral construction is immaterial. Carried by journal boxes 3 are the equalizer bars 8 upon which the truck frame is mounted. The frame mounting includes coil springs 9 for which downwardly facing seats are provided in wheel pieces 7. The equalizer portion of the mounting includes spring saddles 10 each of which comprises an upwardly facing dish-like spring seat 11 and a projection 12 formed on the bottom of the spring seat section and provided with a transverse opening 13 through which the equalizer 8 may pass. This opening has a greater vertical height than the vertical thickness of the equalizer thereby making possible relative vertical movement of the bar and saddle. A bolt 14 may be inserted through suitable holes in the walls of the saddle and through the equalizer bar to prevent such relative movement except when desired. The lower end of the saddle terminates in a flat wall 15, preferably grooved as shown for the purpose referred to later.

The upper face of wheel piece 7 immediately over the spring seat recess forms a flat boss 16 and it will be noted that this aligns vertically with the bottom 15 of the saddle when the truck is assembled.

With this construction, spring 9 may be placed in the wheel piece recess, saddle 10 applied to the spring, and by the jack and chain arrangement shown in Figure 3 or by other suitable means the spring may be compressed so as to align the opening in the saddle with the equalizer receiving openings in the adjacent pedestals to permit the insertion endwise of bars 8 through the saddle and the pedestal openings. After this the jack shown in Figure 3 or other saddle positioning member may be removed and the load of the truck frame applied to the bars through the saddle. Bolt 14 is then applied to prevent any accidental displacement of the saddle on the bar.

To remove and replace the bars, it is only necessary to remove bolt 14, jack up the saddle, whereupon the equalizer may be freely withdrawn. If the frame is then supported by blocks or otherwise, the jack 17 may be lowered until the spring is expanded, when the chain 18 can be removed and the saddle or spring or both may be removed for replacement or for other purposes. The operation will be reversed when the parts are again assembled.

The saddle 19 illustrated in Figure 4 is open at the bottom but otherwise is similar to saddle 10. In this figure the lifting jack 20 is shown as resting on the ground and supporting the saddle through a block 21 but the relation of the truck parts and the assembly and disassembly operations are the same.

My invention relates particularly to that class of car trucks in which the equalizers are approximately straight and may be inserted endwise into their normal position. It will be understood, however, that the contour of the equalizer bars may vary from that shown on the drawings and that other modifications in the details of the construction may be made without departing from the spirit of my invention as expressed in the appended claims.

I claim:

1. In a truck, a frame wheel piece, journal boxes, a substantially straight equalizer beneath and adjacent said wheel piece and carried by said boxes, a saddle on said equalizer, a spring on said saddle supporting said wheel piece, said saddle having an enclosed opening through which said equalizer passes.

2. In a truck, wheeled axles, journal boxes, equalizers extending between and resting upon journal boxes on the same side of car, spring saddles secured on said equalizers, wheel pieces above said equalizers, and springs supporting said wheel pieces on said equalizers through said saddles, said saddles being movable upwardly from their normal position on said equalizers to permit withdrawal or insertion of said equalizer over said boxes.

3. In a truck, wheeled axles, journal boxes, equalizers extending between and resting upon journal boxes on the same side of car, spring saddles on said equalizers, wheel pieces above said equalizers, springs supporting said wheel pieces on said equalizers through said saddles, said saddles being movable upwardly from the normal position on said equalizers, and removable means for preventing such movement.

4. In a truck, wheeled axles, journal boxes, equalizers extending between journal boxes on the same side of car, spring saddles on said equalizers, wheel pieces above said equalizers, and springs supporting said wheel pieces on said equalizers through said saddles, said saddles having openings extending longitudinally of the truck through which respective equalizers pass, said openings being of greater vertical length than the vertical thickness of said equalizers so that said saddles may be raised to permit insertion or removal of said equalizers.

5. In a truck, a wheel piece having a downwardly facing spring seat, an equalizer bar below said wheel piece, a saddle extending around said equalizer bar and provided with an upwardly facing spring seat, and a spring compressed between said wheel piece spring seat and said saddle.

6. In a truck, a wheel piece having a downwardly facing spring seat and a tool engaging face above the same, an equalizer bar below said wheel piece, a saddle secured on said bar but having relative vertical movement thereon and provided with an upwardly facing spring seat and with a tool engaging face below the same, and a spring compressed between said wheel piece spring seat and saddle.

7. A spring saddle for car truck equalizer bars comprising a dish-like spring seat, an integral projection formed on the back thereof and provided with a transverse opening for receiving an equalizer bar and provided with a tool engaging surface on the end opposite said seat whereby the saddle may be lifted independently of a bar passing through said opening.

8. In a truck, a frame wheel piece, journal boxes, an equalizer carried by said boxes beneath said wheel piece, a saddle on said equalizer, a spring on said saddle supporting said wheel piece, said saddle having an enclosed opening extending longitudinally of the truck through which said equalizer passes.

9. In a truck, a wheel piece, spaced pedestals, an equalizer extending into said pedestals, journal boxes carrying said equalizer, a spring seat saddle on said equalizer, a spring thereon supporting said wheel piece, said saddle extending below said equalizer whereby it may be raised to permit withdrawal or insertion of said equalizer.

In testimony whereof I hereunto affix my signature this 24th day of September, 1923.

H. M. PFLAGER.